United States Patent [19]

Harvey

[11] Patent Number: 5,521,885
[45] Date of Patent: May 28, 1996

[54] HYDROPHONE ARRANGEMENT

[75] Inventor: Anthony P. Harvey, Burwood, Australia

[73] Assignee: GEC Marconi Systems Pty Limited, Meadowbank, Australia

[21] Appl. No.: 290,844

[22] PCT Filed: Feb. 21, 1992

[86] PCT No.: PCT/AU92/00067

§ 371 Date: Aug. 19, 1994

§ 102(e) Date: Aug. 19, 1994

[87] PCT Pub. No.: WO93/17356

PCT Pub. Date: Sep. 2, 1993

[51] Int. Cl.$^6$ .................... G01V 1/38; H01B 7/12
[52] U.S. Cl. .............. 367/154; 174/101.5; 367/20
[58] Field of Search ............... 367/154, 20, 155, 367/171; 174/101.5

[56] References Cited

U.S. PATENT DOCUMENTS

| | | |
|---|---|---|
| 3,371,739 | 3/1968 | Pearson . |
| 3,518,677 | 6/1970 | Florian . |
| 3,696,329 | 10/1972 | Hazelhurst . |
| 3,699,237 | 10/1972 | Melia ................. 174/101.5 |
| 3,961,304 | 6/1976 | Bakewell . |
| 4,491,939 | 1/1985 | Carpenter ............... 367/154 |
| 4,538,250 | 8/1985 | De Metz et al. ......... 367/154 |
| 4,554,650 | 11/1985 | Brown et al. ............ 367/154 |
| 4,628,851 | 12/1986 | Appling ................. 174/101.5 |
| 4,679,179 | 7/1987 | Lally ................... 367/154 |
| 4,733,379 | 3/1988 | Lapetina et al. . |
| 4,809,243 | 2/1989 | Bledsoe et al. . |
| 4,955,012 | 9/1990 | Bledsoe et al. . |
| 5,046,055 | 9/1991 | Ruffa . |
| 5,141,796 | 8/1992 | Harvey .................. 174/101.5 |
| 5,251,182 | 10/1993 | Carpenter ................ 367/20 |
| 5,400,298 | 3/1995 | Hepp ..................... 367/20 |

FOREIGN PATENT DOCUMENTS

| | | |
|---|---|---|
| 8764182 | 2/1983 | Australia . |
| 1228227 | 4/1971 | United Kingdom . |
| 2226912 | 7/1993 | United Kingdom . |

OTHER PUBLICATIONS

British Patent Application 2226690A, published Jul. 4, 1990.
British Patent Application 2226912A, published Jul. 11, 1990.

Primary Examiner—Michael J. Carone
Assistant Examiner—Theresa M. Wesson
Attorney, Agent, or Firm—Marshall & Melhorn

[57] ABSTRACT

A towed streamer including a hydrophone (1) supported, in a filler (4) being either liquid or semi-liquid such as a gel having wave damping properties, within a housing (2). The housing (2) is in the form of a tube whose ends are closed by closures such as rigid plugs (3). Where liquid is used wave damping baffles such as open cell foam structures are provided. A rigid shielding arrangement in the form of reinforcing strips (5) can be provided to shield the hydrophone from bulge waves.

14 Claims, 3 Drawing Sheets

HYDROPHONE ARRANGEMENT

BACKGROUND OF THE INVENTION

This invention relates to an hydrophone arrangement within a towed streamer.

This invention relates to hydrophone arrangements within towed streamers which are generally solid filled rather than the more common form of array which is liquid filled.

The term hydrophone is used in this specification to include acoustic sensors which are positioned within such towed streamers.

Towed streamers often comprise several sections, each having its own function and characteristics. The active section of the streamer contains most acoustic sensors which sensors are placed in fixed relationship to each other behind the towing vessel at an appropriate depth. For the sensor to be effective in detecting acoustic waves generated in the water from sources of interest, it is desirable to ensure that the hydrophone is as free from extraneous noise generated by the environment and the towing system as is possible.

Typical noise sources compose sea noise generated by wave action and marine animals, noise produced by water flow over all elements of the towed array and vibration induced excitation from the towing vessel and cross flow over the tow cable sections which are towed at an angle to the direction of tow.

There is associated with each noise source a spectrum of waves which can be characterised by wave speed and frequencies commonly referred to as wavenumber spectrum. The wave excitation originating at sources excite waves in the towed streamer structure of the active section containing the sensors and indeed the waves can be generated within the sensor itself, such waves will be referred to as structural waves.

The region of interest for acoustic targets exists over only a small region of the wavenumber spectrum and is characterized by a single wave speed whereas the noise tends to be from a wider region. Should any of the structural waves existing in the towed streamer be within the acoustic wavenumber window of interest then any genuine acoustic target coinciding with the structural waves will be masked by the presence of such structural waves.

There are two methods of eliminating structural waves. The streamer structure can be designed in such a way that the structural waves are placed outside the acoustic window. This is normally achieved by making the structural waves slower than the acoustic wave speed. However these waves cannot, in general, be prevented from folding back into the acoustic wave space at higher frequencies.

The alternative is to make the arrangement of the hydrophones less sensitive to these structural waves. The present invention provides for a hydrophone arrangement which provides for damping or cancellation of the driving mechanisms within the hydrophone arrangement that can be excited by such structural waves. The difficulty however is to ensure that the accoustic sensitivity of the arrangement is not diminished by damping or cancelling inappropriately.

Turbulent boundary layer noise resulting from flow over the streamer, generates noise from a wide wavenumber spectrum. It is known that filtering of the turbulent boundary layer noise can be achieved by making the hydrophone acoustic window large by comparison with the flow noise wave length, that is by increasing the number of discrete sensors and appropriately spacing them. However this arrangement can also have the advantage of making the arrangement more sensitive to some structural noise but this can be counteracted through careful selection of damping.

The effectiveness of this type of filtering action can be reversed if the waves generated within the medium surrounding the acoustic sensors cannot be damped significantly at higher frequencies.

Other structural noise however also impact on the hydrophones and cannot be alleviated by such spacing arrangements.

SUMMARY OF THE INVENTION

It is therefore an object of the present invention to provide a hydrophone arrangement which will obviate or minimize any one of the disadvantages of prior art arrangements in a simple yet effective manner or at least provide the public with a useful choice.

Broadly the provision placing of hydrophones in a housing filled with a non solid medium having damping properties gives a desirable reduction in noise.

Thus in one form the invention could be said to reside in a hydrophone arrangement within a towed streamer including at least one hydrophone disposed within a housing, the housing being closed off at both ends by a rigid closure the housing being filled with a liquid or semi-liquid filler adapted for damping acoustic waves.

The non-solid fill layer can exist in several forms whilst providing a damping function. The filler can be a gel which if necessary can be made to change its rheological status to achieve the required properties. One such property of the gel is that it can be placed in the hydrophone as a fairly high viscous gel. After the application of shear stresses, the viscosity can be lowered. The gel is preferably selected or made up such that at operating temperature of the towed streamer it is in the semi liquid form, but that when a structural wave enters the gel, the gel at a micro level becomes liquid. In this way the energy of the structural wave becomes dissipated and a damping effect occurs.

Alternatively the damping can be achieved using a liquid and surrounding the acoustic sensor or sensors is a baffle means. The baffle means is a solid and acts to damp structural waves as the fluid is forced through the baffle. One such baffle that can be used is an open cell foam structure positioned around the acoustic sensors.

The housing material can assist in reducing the energy picked up by the hydrophone if the housing is constructed from a deformable material that can dissipate structural wave energy.

Further embodiments of the invention are better understood in context with the basic structure of a solid towed streamer, one form of which will now be briefly described and will be described in more detail below. Such a solid streamer comprise a central core containing the sensors, which is surrounded by a layer of cords which may or may not include the main strength members. This layer is generally held in place by a braided layer. This assembly is gel filled to fill all gas voids. A jacket is placed over the gel filled layer. In some designs the high tensile strength members can be placed in the jackets.

Excitation of the strength members by flow noise or vibration induced noise will in turn drive the closures of the housing. This can excite a bulge wave in the hydrophone filler by expanding and contracting the flexible housing and an extensional wave will also be generated. Such a bulge wave and extensional wave can be dampened by using a deformable material.

The hydrophone can therefore be formed so that the hydrophone housing is resiliently deformable and thereby provides a damping effect, and the damping medium within the housing gives additional damping of the end-plug driven waves. The resiliently deformable housing also facilitates bending around the minimum diameter of a bollard.

Additional reduction of the noise sources can be gained by placing the hydrophones in the tube in a regular pattern relative to the end caps.

Where the strain members are placed in the jacket a radial compressive force is generated on the core as the jacket is stretched and relaxed by strain members. This compressive force is generated as a travelling wave. It is found that such noise can be overcome where the deformable housing is stiffened circumferentially adjacent to the acoustic sensors.

Thus a hydrophone arrangement having a plurality of regularly spaced apart acoustic senors within one hydrophone housing, the housing being of generally flexible material, but being laterally stiffened adjacent each of said spaced apart sensors.

Alternatively each of the regularly spaced apart acoustic sensors can be housed each within one housing, each of the housings having a rigid wall.

Alternatively or additionally, the reduction of the noise may be enhanced by arranging hydrophones symmetrically within the hydrophone housing to cancel similar structural waves propagating in both directions within the housing.

BRIEF DESCRIPTION OF THE DRAWINGS

For a better understanding preferred embodiments of the invention will be described with reference to the accompanying drawings wherein.

DETAILED DESCRIPTION OF THE PREFERRED EMBODIMENTS

Figure 1:
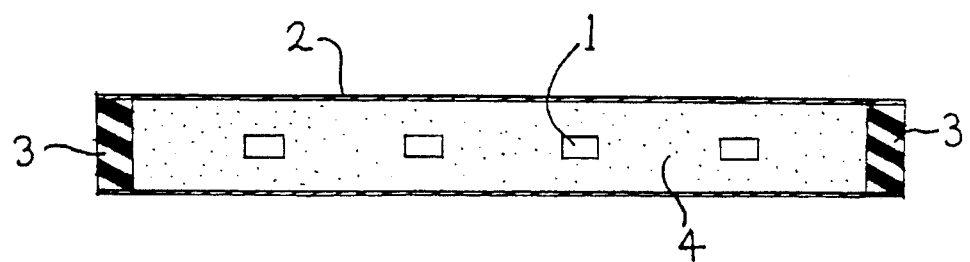
FIG. 1 is a part schematic plan view of the layout of a first embodiment of the invention.
Figure 2:
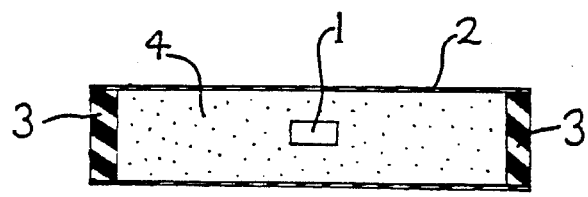
FIG. 2 is a part schematic plan view of the layout of a second embodiment of the invention.
Figure 3:
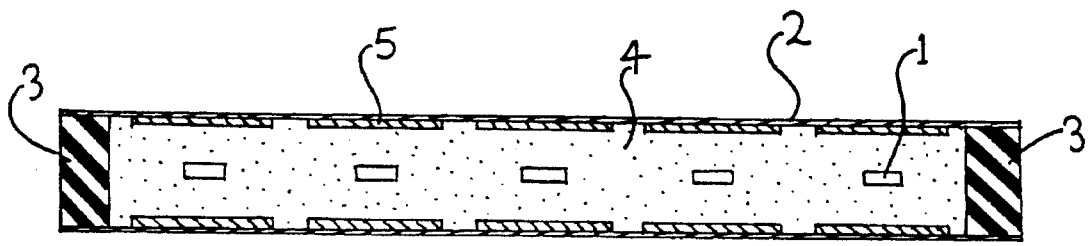
FIG. 3 is a part schematic plan view of the layout of a third embodiment of the invention.
Figure 4:
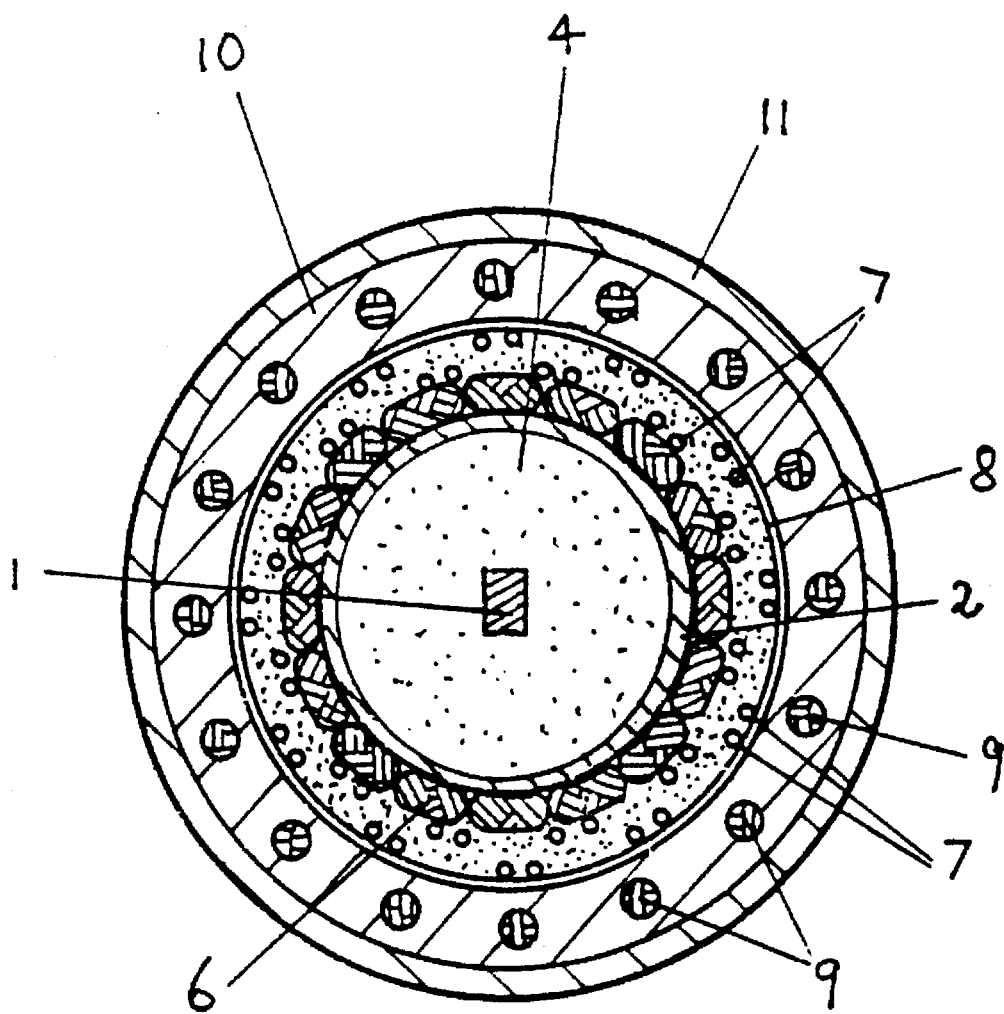
FIG. 4 is a cross-sectional view showing the position of the hydrophone arrangement within one type of solid cable.

The hydrophone arrangement includes an acoustic sensor or hydrophone 1, housed within a hydrophone housing 2. The housing takes the form of a cylindrical tube with open ends, which open ends are closed by closures, which in the illustrated embodiments take the form of rigid plugs 3. The hydrophones 1 are held in place inside the hydrophone housing, which is filled with a filler 4 being either a liquid or a gel.

Figure 5:
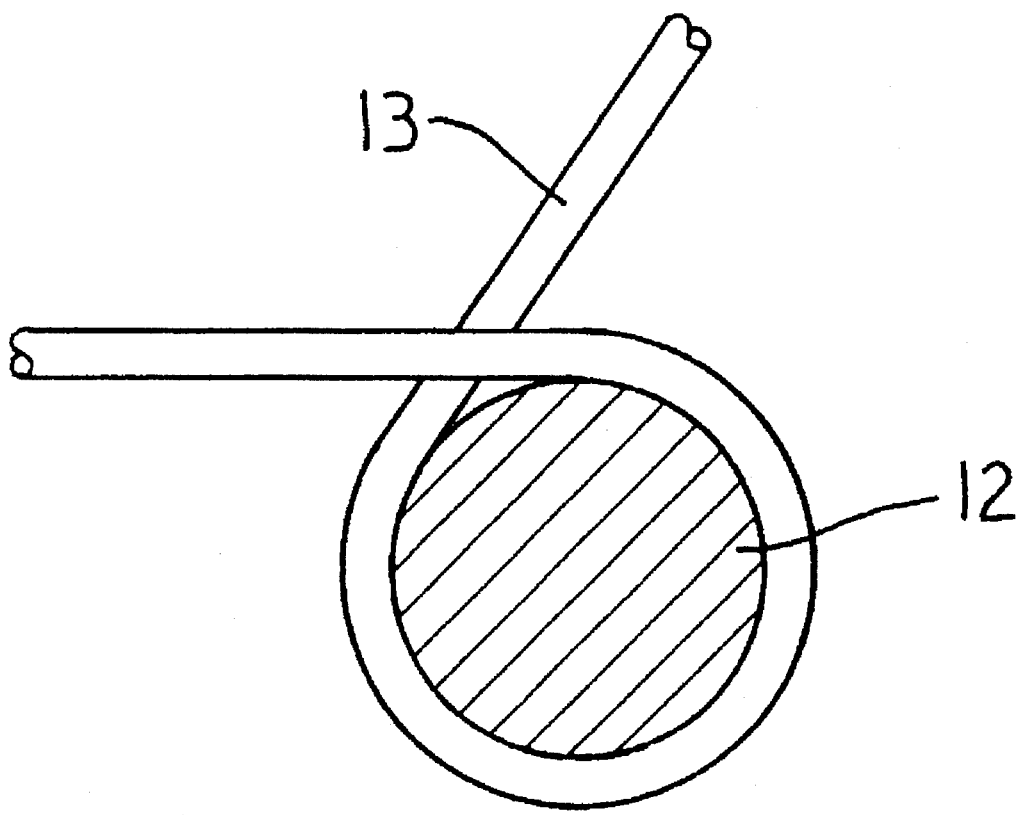
FIG. 5 is a sectional view of a streamer wound around a bollard.

In the first embodiment shown in FIG. 1 the housing is made of a flexible tubing such as a polyurethane or rubber tube. The plugs can be made of a dense polyurethane. The filler is a liquid such as a hydrocarbon and can be one sold under the Trade Mark "ISOPAR". The hydrophones are regularly spaced apart, and similarly spaced apart from the plugs. FIG. 5 show a bollard with a streamer 13 wrapped around the bollard 12.

In the second embodiment the housing is made of a non-flexible tubing such as a layer of carbon fibres. The rigid tubing assists in the rejection of radial compression but does not act as well for damping of end cap induced waves. The plug is again of a rigid type. The filler 4 is as in the first embodiment is of a fluid type supported within an open cell foam. The open cell foam structure acts as a baffle to damp structural waves. Several of these units can aligned and regularly spaced apart, so that turbulent boundary noise is reduced. Furthermore the fluid in the hydrophone can be modified to provide some filtering against some wave numbers in the wavenumber spectrum of the flow noise.

The third illustrated embodiment comprises a structure similar to that in FIG. 1, wherein the hydrophones are regularly spaced apart. The length of the housing allows rejection of the turbulent boundary noise. The wall of the housing is of a flexible nature, however the wall is reinforced laterally with reinforcing strips, 5. The reinforcing strips are spaced apart to coincide with the hydrophones. Such reinforcing strips act as lateral shields by reacting with radial compression produced by the jacket, and prevent activation of the hydrophones from that source. The filler within the housing in this embodiment is in the form of a gel, and one example of gel used is such as is sold under the Trade Marks "OPTIFILL" or "INSJELL".

Whilst details of the hydrophone themselves has not been described such sensors are well known in the art mainly originating from piezo electric conversion, and a suitable such hydrophone can be used.

Turning now to the position of the hydrophone arrangement within the streamer. The hydrophone housing 2 is positioned centrally with relative to the towed streamer having inside it the hydrophone 1, which is surrounded by a filler 4. The housing has laid about it a plurality of filler cord 6, which filler cords are generally an elastic compound such as a polypropylene, these are held in place by a braid 7. The braid and the filler cord layers provide a broad support for a gel such as a gel whose rheological status can be modified by friction or heat. This gel filled layer is surrounded by a paper wrapper 8 which paper wrapper is formed by helically winding a strip of paper around the gel layer. Strength members 9 such as high tensile strength members such as are made of the material sold under the Trade Mark "KEVLAR" or "VECTRAN" are positioned around the paper wrapper, and an inner jacket 10 is extruded around the strength members. The inner jacket is made of a thermoplastics rubber. An outer jacket 11 made of an abrasion resistant water impermeable material such as thermoplastic polyurethane is extruded over the inner jacket.

Various features of the invention have been particularly shown and described in connection with the illustrated embodiments of the invention, however, it must be understood that these particular arrangements merely illustrate and that the invention is to be given its fullest interpretation within the terms of the appended claims.

I claim:

1. A towed streamer cable comprising:

a central core, said central core including a longitudinal core tube;

a pair of rigid plugs positioned in spaced-apart relationship within the core tube to define a tubular housing;

at least one hydrophone enclosed within the tubular housing;

a gel disposed within the tubular housing of the core tube and surrounding said hydrophone;

reinforcing strips affixed to an inner wall of the tubular housing to laterally shield said hydrophone:

a layer of cords disposed annularly about said central core, said layer of cords including a gel filling;

a plurality of strain members positioned on said layer of cords and peripherally spaced-apart from the tubular housing; and an outer jacket encasing said plurality of strain members, said layer of cords, and the tubular housing.

2. The towed streamer cable defined in claim 1, including a plurality of regularly spaced-apart hydrophones.

3. The towed streamer cable defined in claim 1, wherein the gel filling includes a rheologically modifiable gel which maintains a generally liquid form when modified by shear forces.

4. The towed streamer cable defined in claim 1 wherein the gel filling is a fluid type supported within an open cell foam.

5. The towed streamer cable defined in claim 1, including a baffle formed by an open cellular structure positioned within the tubular housing to dampen structural waves.

6. The towed streamer cable defined in claim 1, wherein the tubular housing is rigid and contains a single hydrophone.

7. The towed streamer cable defined in claim 1, including a plurality of unconnected, adjacent hydrophones, each hydrophone positioned within a separate tubular housing formed by pairs of rigid plugs positioned within the core tube.

8. The towed streamer cable defined in claim 1, wherein the core tube is resiliently deformable to facilitate bending around a minimum diameter of a bollard.

9. The towed streamer cable defined in claim 1, wherein the core tube is resiliently deformable apart from the reinforcing strips, said strips being positioned to coincide with a plurality of spaced-apart hydrophones in the core tube.

10. The towed streamer cable defined in claim 1 including a plurality of spaced apart rigid cylinders positioned adjacent the tubular core to coincide with the plurality of hydrophones.

11. The towed streamer cable defined in claim 1, including a plurality of hydrophones spaced apart symmetrically within the tubular housing.

12. A towed streamer cable comprising:

a central buoyant core, said central core including a longitudinal, resiliently deformable core tube;

a pair of rigid plugs positioned in spaced-apart relationship within the core tube to define a tubular housing;

at least one hydrophone enclosed within the tubular housing;

a gel disposed within tubular housing of the core tube and surrounding said hydrophone;

reinforcing strips affixed to an inner wall of the tubular housing to laterally shield said hydrophone;

a layer of filler cords surrounding the core tube, said layer of filler cords secured by a braided layer;

a layer of gel to fill said filler cords and the braided layer;

a plurality of strain members positioned on said filler cords and layer of gel, said strain members peripherally spaced-apart from the tubular housing;

an inner jacket formed over and around said plurality of strain members; and an outer jacket encasing said inner jacket.

13. The towed streamer cable defined in claim 12, wherein the strain members are positioned within the inner jacket.

14. A towed streamer cable comprising:

a central core, said central core including a longitudinal core tube;

a pair of rigid plugs positioned in spaced-apart relationship within the core tube to define a tubular housing;

at least one hydrophone enclosed within the tubular housing;

a gel disposed within the tubular housing of the core tube and surrounding said hydrophone;

a baffle formed by an open cellular structure positioned within the tubular housing;

a layer of cords disposed annularly about said central core, said layer of cords including a gel filling;

a plurality of strain members positioned on said layer of cords and peripherally spaced-apart from the tubular housing; and an outer jacket encasing said plurality of strain members, said layer of cords, and the tubular housing.

* * * * *